Figure 1:
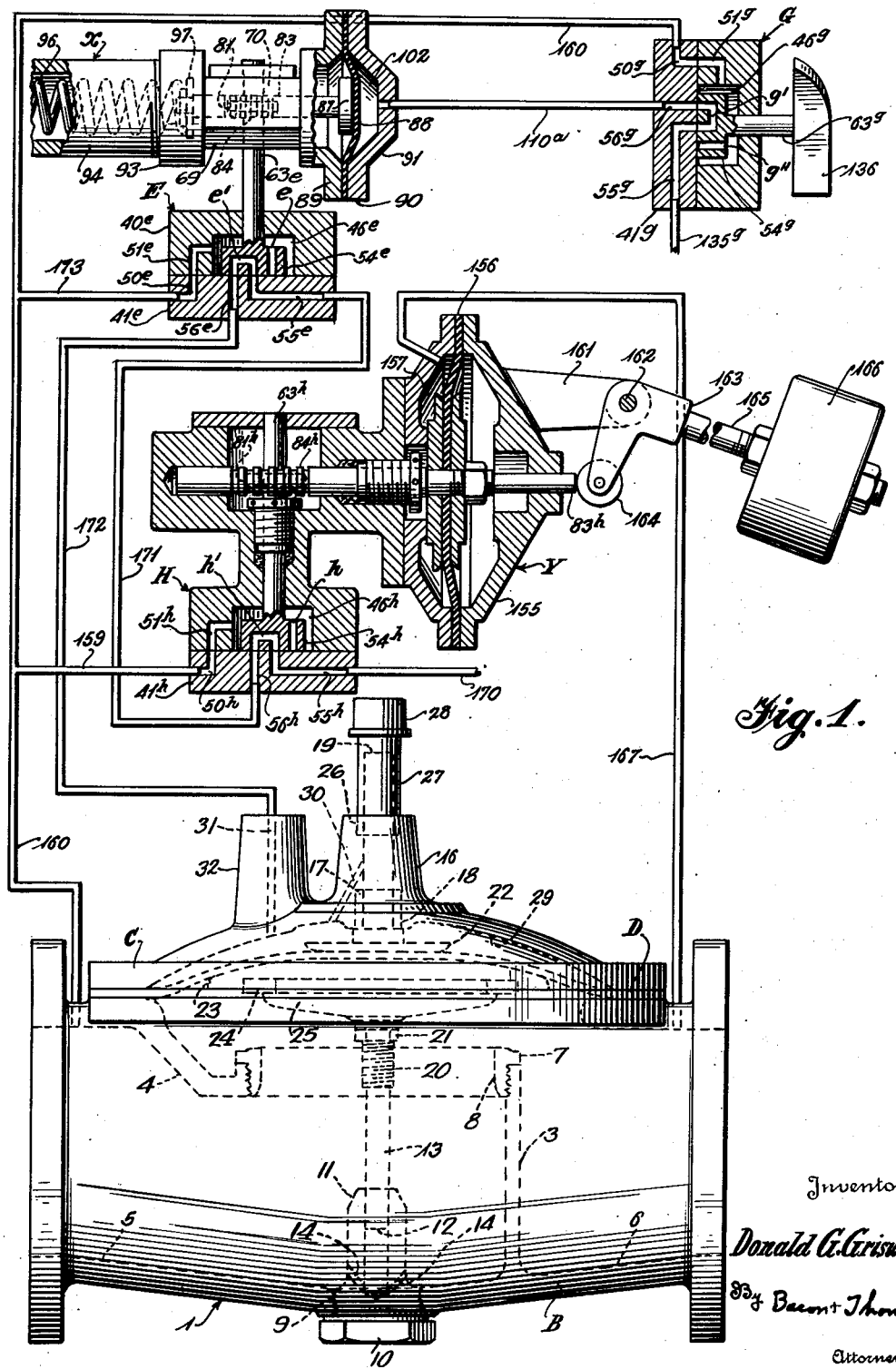

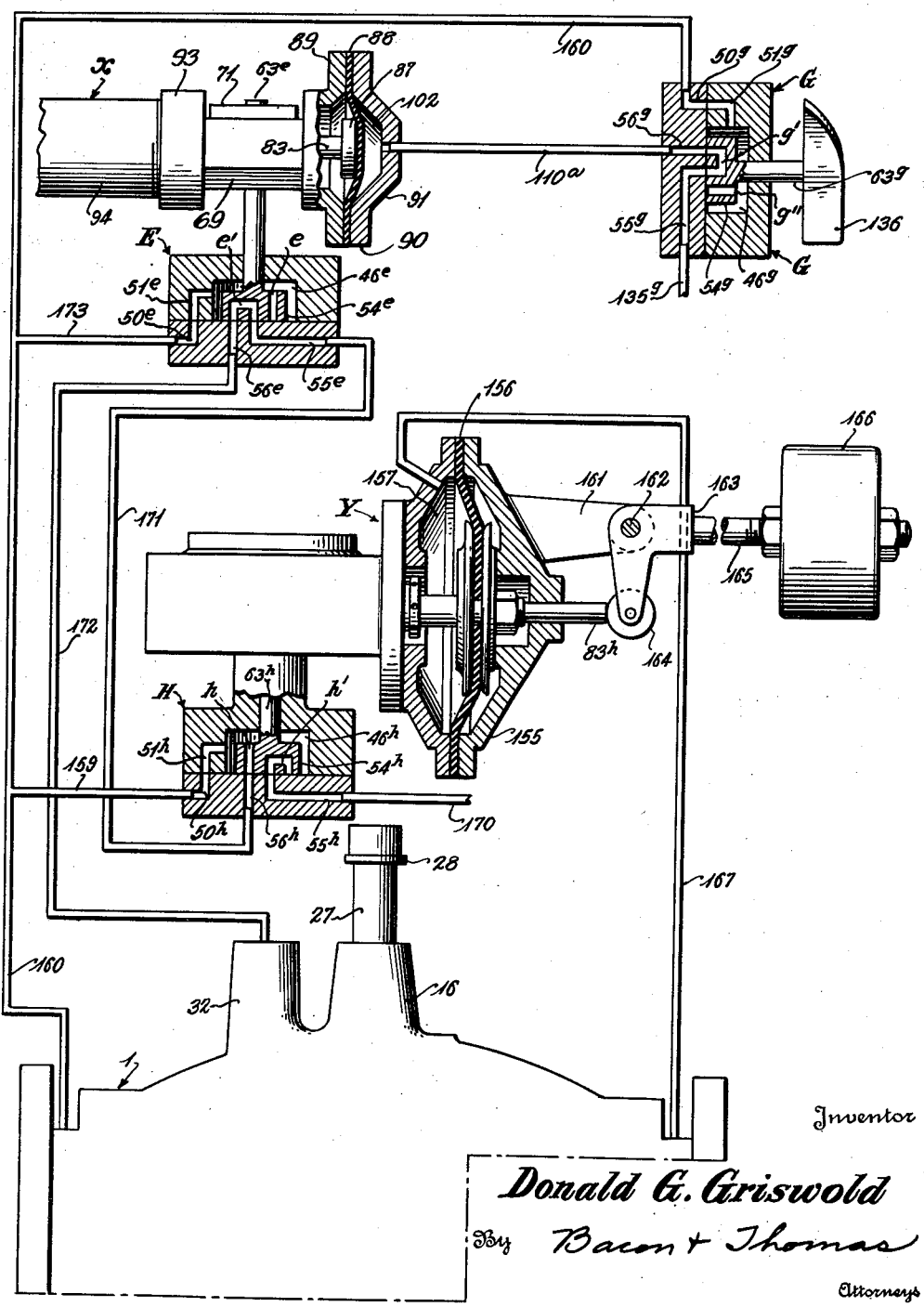

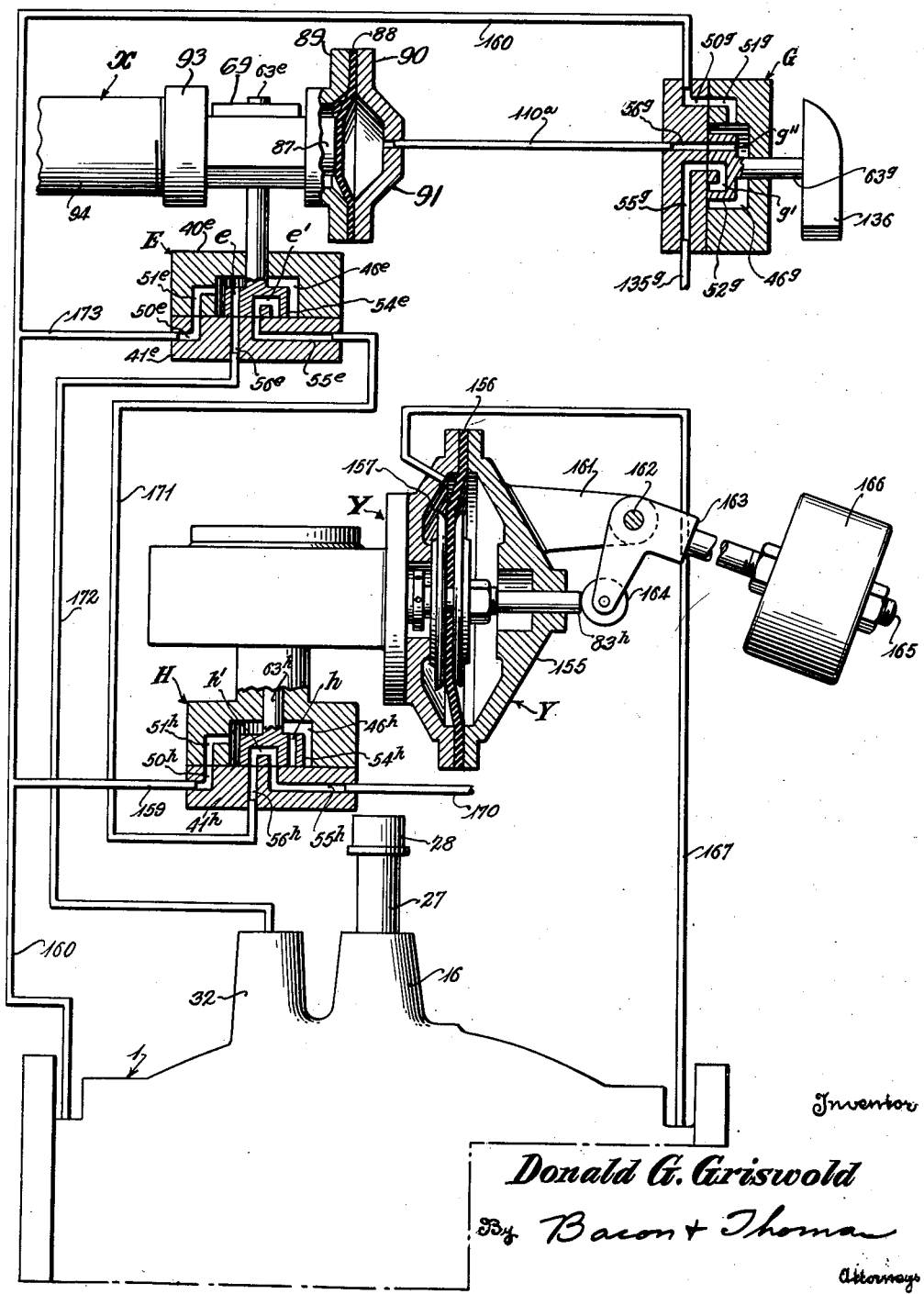

Patented June 28, 1949

2,474,355

UNITED STATES PATENT OFFICE 2,474,355

REMOTE-CONTROL MEANS FOR VALVES

Donald G. Griswold, Alhambra, Calif., assignor to Clayton Manufacturing Company, Alhambra, Calif.

Application August 29, 1942, Serial No. 456,678

2 Claims. (Cl. 137—139)

This invention relates to control means for valves and more particularly to control means for effecting closing of said valves from one or a plurality of points.

More particularly the invention relates to control means for automatic fluid-pressure-operated main valves, the control means being adapted to be operated to effect closing of said main valves independently of the means normally automatically controlling the opening and closing of said main valves.

The invention further relates to control means for automatic fluid-pressure-operated main valves, said control means being adapted to be located at one or more convenient points remote from the main valve, whereby said main valve can be closed at will by at least one of said remote control means.

The principal object of the invention is to provide manually operable control means for effecting immediate closing of an automatic valve in an emergency.

Another object of the invention is to provide main valve control means including a plurality of control devices, either of which may be actuated to effect the closing of said main valve.

Another object of the invention is to provide a plurality of control means for a fluid-pressure-operated main valve arranged so that one of the control means is capable of maintaining the main valve closed irrespective of the operation of another of said control means.

Another object of the invention is to provide two or more remote control means for a main valve, either of which remote control means may be actuated to effect the closing of said main valve, one of said control means, however, being capable of maintaining the main valve closed and/or effecting closing of the main valve irrespective of the operation of another of said control means.

Another object of the invention is to provide remote control means for effecting the closing of an automatic valve independently of the automatic means which normally controls the operation of said valve, said remote control means being preferably manually operable.

A more specific object of the invention is to provide, in a system including an automatic pilot-controlled main diaphragm valve, means for effecting closing of said diaphragm valve at will independently of said automatic pilot.

Another specific object of the invention is to provide, in a system including a main pressure-responsive valve having an automatic control means for maintaining a given pressure in a pipe line, means for effecting closing of said main valve and maintaining said main valve closed independently of said automatic control means.

Still another specific object of the invention is to provide, in a system including an automatic pilot-controlled altitude valve, means for effecting closing of said altitude valve and maintaining said altitude valve closed independently of said pilot valve.

Other and further objects of the invention will be apparent from the following description taken in conjunction with the accompanying drawings, in which:

Fig. 1 is a view of a weighted altitude valve of the pilot-controlled type having a fluid-pressure-operable device and pilot valve operably associated with the main pilot and arranged to be controlled by a third or emergency pilot so that the altitude valve can be closed independently of the position of the main pilot valve, the parts being diagrammatically shown in the position they assume during normal operation of the main valve while the main valve is open;

Fig. 2 is a view similar to Fig. 1 showing the parts in the position that they assume during the normal operation of the main valve and while the main valve is in its closed position; and Fig. 3 is a view similar to Fig. 1 but with the parts in the position they assume when the "at will" or emergency pilot valve has been actuated to effect an emergency closing of the main valve.

Referring now to the drawings, the main diaphragm valve is generally indicated by the numeral 1 and includes a body B, cover C and a circular diaphragm D whose marginal portion is conventionally clamped between the body B and the cover C by any suitable number of cap screws (not shown). The body B is provided with a substantially vertical partition wall 3 which cooperates with an inclined wall portion 4 to provide inlet and outlet chambers 5 and 6, respectively, in said body. The wall portions 3 and 4 are merged to provide a circular opening which is threaded and adapted to receive an annular valve seat 7. The valve seat 7 is provided with a circular opening 8 through which water or other fluid can pass in traveling from the inlet chamber 5 to the outlet chamber 6.

The valve body B has a threaded opening 9 axially aligned with the opening 8 in the valve seat 7. An elongated plug 10 is threaded into the opening 9 and includes a tubular guide portion 11 for the lower end 12 of a valve stem 13. Ports 14 extend through the guide portion 11 and connect the interior thereof with the inlet chamber 5, whereby resistance to downward movement of the valve stem 13 by fluid within the guide 11 is precluded.

The cover member C is provided with a central boss portion 16 counterbored at 17 to receive a guide bushing 18 for the upper end 19 of the valve stem 13. The bushing 18 is arranged so that it is in axial alignment with the plug 10 and serves as a guide for the upper end of the valve stem 13. The valve stem 13 has a threaded portion 20 intermediate the ends thereof adapted to receive nuts 21 for clamping followers 22 and 23 in position upon opposite sides of the diaphragm D for retaining an annular sealing ring 24 in position in the follower 23 by means of a clamping member 25.

The boss 16 of the cover member C has a threaded opening 26 adapted to receive one end of a pipe nipple 27 which serves as a housing for the upper end 19 of the valve stem 13. A pipe cap 28 is mounted upon and forms a closure for the opposite end of the pipe nipple 27.

The cover C is provided with a cavity 29 adapted to receive operating fluid under pressure for actuating the diaphragm D. The cover member C is further provided with a passageway 30 establishing free communication between the diaphragm pressure chamber 29 and the space surrounding the upper end of the valve stem 13. This arrangement precludes possible entrapment of fluid in the pipe nipple 27 which otherwise might interfere with the upward movement of the valve stem 13. Fluid under pressure may be admitted into and exhausted from the diaphragm chamber 29 by means of a passageway 31 formed in a boss 32 carried by the cover member C, the lower end of the passageway 31, of course, communicating with the chamber 29.

A pilot valve E and the mechanism X for producing emergency actuation thereof under control of a pilot valve G is best illustrated in Fig. 1. The main pilot valve E includes a housing 40e which is secured to a combined fluid distribution and adapter member 41e by screws (not shown).

The pilot valve housing 40e contains a pressure or pilot disc chamber 46e which is continuously subjected to the pressure of the fluid in the inlet chamber 5 of the main valve, the fluid being conducted from said inlet chamber through a conduit 160 arranged exteriorly of the main valve 1, one end of said conduit being connected with the valve body B and the opposite end of said conduit being connected with the pilot valve G. A branch conduit 173 connects the conduit 160 with the adapter 41e, said adapter having a channel 50e for delivering fluid to a passageway 51e in the pilot valve housing 40e. A pilot valve disc 54e is disposed in the pressure chamber 46e and is connected with a pilot drive shaft 63e. The adapter member 41e is provided with a first passageway 55e and a second passageway 56e, the latter being connected by a conduit 172 with the passageway 31 in the valve cover C.

The pilot valve disc 54e is provided with a throughport e adapted to place the pressure chamber 46e in communication with the diaphragm chamber 29 of the main valve 1 and thus admit operating fluid into said diaphragm chamber of said main valve. The pilot disc 54e is also provided with a U-shaped port e' arranged so that, when said pilot disc assumes the position shown in Fig. 1, it will establish communication between the two passageways 55e and 56e in the adapter 41e. As will be apparent from the drawings, the first passage 55e is always in communication with the U-shaped port e'.

The pilot valve E is adapted to be operated only in the event of emergency, or in the event that it is desirable at any other time to effect closing of the main valve 1 regardless of the operative position of an automatic pressure-responsive control valve Y. The turning of the pilot disc 54e is controlled by the (emergency) pilot valve G through the intermediary of the diaphragm-operated mechanism X, which will now be described.

The mechanism X, which effects rotation of the shaft 63e to actuate the pilot disc 54e, includes a casing 69 provided with a chamber 70 through which the upper portion of the pilot shaft 63e extends. A gear 81 is mounted upon the shaft 63e within the chamber 70.

The gear 81 need not be toothed throughout its periphery, but in any event, is provided with sufficient teeth to be rotated through an angle of about 60° by a reciprocable rod 83 provided with ridges 84, which convert a portion of said rod into a rack effective to impart turning movement to the gear 81. Turning of said gear necessarily causes rotation of the pilot disc shaft 63e.

One end of the rod 83 carries a circular plate 87 which engages one side of a flexible diaphragm 88. The diaphragm 88 is marginally secured between a flange 89 formed integral with the casing 69 and a flange 90 formed upon a cover plate 91, the cover plate 91 and the casing 69 being secured together by a suitable number of screws (not shown).

The casing 69 is also provided with an internally threaded annular flange 93 adapted to receive one end of a pipe nipple 94. A helical compression spring 96 is received within the pipe nipple 94 and one end of said spring rests against a washer 97 mounted upon a shouldered end 98 of the rod 83. The opposite end of the spring 96 engages a suitable abutment (not shown) in the pipe nipple 94.

The function of the spring 96 is to normally maintain the rod 83 in its leftmost position as viewed in Fig. 1 so that the pilot disc 54e will normally be in the position shown with the port e' interconnecting the passageways 55e and 56e. The cover 91 is shaped so as to provide a chamber 102 adapted to receive operating fluid under pressure to effect shifting of the rod 83 to the right to thereby turn the pilot disc 54e to position the same so that the main valve 1 can be closed by the emergency control pilot valve G, in a manner which will be explained hereinafter. The stroke of the rod 83 is definitely limited so that the pilot disc 54e is turned through exactly the right angle necessary to position either the port e or e' in cooperating relation with the passageway 56e in the adapter 41e.

The emergency pilot valve G is connected by a conduit 110a with the chamber 102 and operating fluid under pressure is supplied to said pilot valve through the conduit 160.

The emergency pilot valve G has an adapter 41g identical in construction with the adapter 41e of pilot valve E and the only difference between the two pilot valves G and E is that the pilot valve G is adapted to be manually operated by a knob 136, whereas the pilot valve E is operated only in response to manipulation of the pilot valve G. However, in order to facilitate identification of the parts of the pilot valve G, they have been given the same numbers as the parts of pilot valve E except that the letter "g" has been added to the numeral in lieu of the letter "e."

Coincidentally, the emergency pilot valve G has its pilot disc $54^g$ positioned to exhaust pressure fluid from the diaphragm chamber 102 of the fluid-pressure-operable device X for actuating pilot disc $54^e$. Thus, conduit $110^a$ connects the chamber 102 with the passageway $56^g$ in the adapter $41^g$ so that fluid can flow through the port $g'$ in the pilot disc $54^g$, the passage $55^g$ and thence into the drain conduit $135^g$. In the absence of fluid pressure in the diaphragm chamber 102, the pilot disc $54^e$ of the pilot valve E will maintain the port $e'$ in such position that it is in series with a corresponding port $h'$ in a pilot disc $54^h$ of a pilot valve H controlled by the pressure-responsive means Y as will appear more fully hereinafter.

The main valve 1 may be associated with a tank (not shown) and the control mechanism Y may be directly connected with the tank instead of with the outlet chamber 6 of the main valve. In either case, the mechanism Y will be operated in accordance with the head of water in the tank and cause the main valve 1 to function as an automatic altitude valve.

The mechanism Y, as diagrammatically illustrated, includes a diaphragm housing 155 and a diaphragm 156 arranged to provide a pressure chamber 157 on one side of said diaphragm. A rod or stem $83^h$ is operatively connected with the diaphragm 156. An intermediate portion of the rod $83^h$ is provided with rack teeth $84^h$ which mesh with a gear $81^h$ secured to the upper end of a pilot shaft $63^h$. The lower end of the pilot shaft $63^h$ is connected to a pilot disc $54^h$ received in a pressure chamber $46^h$. The pressure chamber $46^h$ is connected by a passage $51^h$, channel $50^h$ and a conduit 159 with the fluid pressure supply conduit 160.

The pilot valve H includes an adapter member $41^h$ having a first passageway $55^h$ and a second passageway $56^h$ formed therein. A conduit 171 connects the passage $56^h$ with the passage $55^e$ of the pilot valve E, so that the pilot valves E and H are interconnected in series, as will appear more fully hereinafter. The pilot disc $54^h$ is provided with a port $h'$ which establishes communication between the passages $55^h$ and $56^h$ when in the position shown in Fig. 1. The pilot disc $54^h$ is also provided with a through-port $h$ for controlling the flow of operating fluid under pressure from the conduit 159 to the diaphragm chamber 29 of the main valve 1 to effect closing of said main valve, as will be explained more fully hereinafter.

The casing 155 of the pressure-responsive control mechanism Y carries a rigid arm 161 which supports a fulcrum pin 162 for a bellcrank 163. One arm of the bellcrank 163 carries a roller 164 the periphery of which abuts the outer end of the rod $83^h$. The opposite end of the bellcrank 163 carries a counterweight arm 165 having an adjustable counterweight 166 thereon. As will be apparent from the drawings, the pivoted counterweight tends to maintain the rod $83^h$ in its leftmost position, the result of which is to position the pilot disc $54^h$ in the position illustrated in Fig. 1. Movement of the rod $83^h$ toward the right is effected by the admission of the fluid under pressure into the diaphragm pressure chamber 157, whereby the diaphragm 156 is flexed toward the right carrying the rod $83^h$ along with it against the opposing force offered by the counterweight 166.

The diaphragm chamber 157 may be connected with a water column (not shown), or with the outlet chamber 6 of the main valve 1. For convenience in disclosing the invention, the diaphragm chamber 157 has been shown connected with the outlet chamber 6 by a conduit 167. It will be clear that when the main valve 1 is connected with a water storage tank, the pressure of the head of water in the tank will be communicated to the outlet chamber 6 of the main valve and thence through the conduit 167 to the diaphragm pressure chamber 157 of the pressure-responsive control Y. Obviously, as the head of water in the tank increases the pressure communicated to the chamber 157 will increase stressing the diaphragm 156 and effecting movement of the rod $83^h$ toward the right against the resistance offered by the counterweight 166. When the head of water has reached a predetermined height, sufficient to overcome the force exerted by the counterweight 166, the rod $83^h$ will move toward the right a sufficient distance to rotate the pilot disc $54^h$ to the position shown in Fig. 2, thereby permitting operating fluid under pressure to leave the pressure chamber $46^h$ through the pilot port $h$, to effect automatic closing of the main valve 1, as will be explained hereinafter.

The first passageway $55^h$ of the pilot valve H always communicates with the port $h'$ and is connected with a drain conduit 170, whereas, the second passageway $56^h$ is connected to one end of a conduit 171, the opposite end of which conduit is connected to the first passageway $55^e$ of the pilot valve E. The passageway $56^e$ of the pilot valve E, as previously mentioned, is connected by conduit 172 with the diaphragm pressure chamber 29 of the main valve 1. A conduit 159 connects the pressure chamber $46^h$ with the supply conduit 160. When the main valve 1 is in its open position illustrated in Fig. 1, the port $e'$ of the pilot disc $54^e$ is positioned so as to interconnect the passageways $55^e$ and $56^e$. At the time that the main valve 1 is open the diaphragm chamber 29 thereof is vented to the atmosphere through the conduit 172, passage $56^e$, port $e'$, passage $55^e$, conduit 171, passage $56^h$, port $h'$, passage $55^h$ and the drain conduit 170.

As has been previously indicated, Fig. 2 illustrates the position of the pilot disc $54^h$ during the automatic operation of the main valve 1 and when the pressure in the diaphragm chamber 157 of the pilot valve H has become sufficient to shift the rod $83^h$ to the right and thereby rotate said pilot disc counterclockwise to effect closing of the main valve 1. It will be noted that the position of the pilot disc $54^e$ of the pilot valve E has not been changed. The flow of operating fluid to effect closing of the main valve 1, therefore, occurs from the supply line 160 to the conduit 159, through channel $50^h$, and passage $51^h$, into the pilot disc pressure chamber $46^h$. Pressure fluid flows from said chamber through the pilot port $h$, passage $56^h$ and conduit 171 into the passage $55^e$ of the pilot valve E. The fluid then passes from the passage $55^e$ through the pilot port $e'$, passage $56^e$, and conduit 172 into the diaphragm chambers 29 of the main valve 1. Thus, the pilot valves H and E are connected in series during normal closing of the main valve 1.

It will be understood that when the pressure head drops sufficiently, the pressure in the diaphragm chamber 157 of the pressure-responsive device Y will correspondingly drop and the counterweight 166 will effect movement of the rod $83^h$ toward the left to return the pilot disc $54^h$ to its initial position shown in Fig. 1, the spent operating fluid returning to the outlet chamber 6 through the conduit 167. The main valve 1 will now exhaust spent operating fluid from chamber 29 in the manner already described and will open and assume normal operation permitting water to flow until the pressure head is restored sufficiently to effect automatic closing of said main valve, as has also been described.

Fig. 3 illustrates the relative position of the parts after the emergency pilot valve G has been manually operated to effect closing of the main valve 1. As is here shown, the operating fluid supply line 160 is connected directly with the channel 50$^g$ so that operating fluid can flow through the passage 51$^g$ into the pilot disc pressure chamber 46$^g$. The manual actuation of the pilot shaft 63$^g$ will have positioned the pilot disc 54$^g$ so that the through-port g'' will be in registration with the passageway 56$^g$. Pressure fluid can now flow through the conduit 110$^a$ into the pressure chamber 102 of the control device X to operate the diaphragm 88 and effect shifting of the rod 83 toward the right. Such shifting of the rod 83 will position the pilot disc 54$^e$ so that the through-port e will register with the passageway 56$^e$. Operating fluid now flows through the passage 56$^e$, into the conduit 172, and then into the main diaphragm chamber 29 of the main valve 1 to effect closing of said main valve.

When the emergency pilot valve G is actuated, as described, the main valve 1 will close irrespective of the position of the pilot disc 54$^h$ in the main pilot valve H. This is so for the obvious reason that the operating fluid under pressure is now shunted around the pilot valve H. If the main valve 1 happens to be closed at the time that the emergency pilot valve G is operated, it will remain closed. The only way in which said main valve 1 can be opened is to again actuate the emergency pilot valve G to return the pilot disc 54$^g$ to its initial position. The return of the pilot disc 54$^g$ will then permit the pressure fluid in the chamber 102 to be expelled by the pressure of the spring 96 acting through the diaphragm 88. As will be apparent from Fig. 1, the spent fluid will drain through the emergency pilot valve G via the passageway 55$^g$ and the drain conduit 135$^g$.

Thus, it will be seen that during the normal wide-open position of the main valve 1 the diaphragm chamber 29 of said main valve is opened to the atmosphere or drain through both the pilot discs 54$^e$ and 54$^h$. When the main valve 1 is closed in its normal automatic operation by the pilot valve H, operating fluid, in order to reach the diaphragm chamber of the main valve 1 must pass through both the pilot discs 54$^h$ and 54$^e$. However, when the main valve 1 is closed by the actuation of the emergency control pilot valve G, the operating fluid under pressure flows only through the pilot disc 54$^e$ (Fig. 3).

While the use of two or more pilot valves has been disclosed herein for the purpose of controlling certain given types of valves, it will be understood that the pilots and the control means are not restricted to the particular use or in the particular environments disclosed herein and it is contemplated that various other specific applications of the same will be apparent and come within the spirit of the invention and the scope of the annexed claims.

I claim:

1. In combination, an automatic valve and emergency remote control means for said valve, comprising: a main valve body having inlet and outlet chambers and closure means for controlling the flow between said chambers; and three pilot valves, each of said pilot valves having a chamber for fluid under pressure connected with the inlet chamber of said main valve and a ported pilot disc in said pressure chamber, the first of said pilot valves being capable of effecting closing and opening of said main valve and having a pressure-responsive mechanism associated therewith connected with the outlet chamber of said main valve, said mechanism being operably connected with the pilot disc of said first pilot valve so that said first pilot valve is automatically actuated in accordance with the pressure conditions in the outlet chamber of said main valve, the second of said pilot valves having a fluid-pressure-operable device associated therewith for actuating the pilot disc of said second pilot valve and thus controlling the operation of said second pilot valve, the pilot disc of said second pilot valve being arranged so that normally operating fluid can flow therethrough to and from said main valve in accordance with the position of the pilot disc of said first pilot valve, the pilot disc of the third of said pilot valves being arranged to control the admission and exhaust of operating fluid to the fluid-pressure-operable device associated with said second pilot valve, whereby said third pilot valve can control actuation of said second pilot valve disc to effect closing of said main valve independently of both said first pilot valve and the pressure in the outlet chamber of said main valve.

2. In combination, a main valve arranged to be operated by fluid under pressure and having inlet and outlet chambers and closure means to control the flow between said chambers; three pilot valves operatively associated with said main valve, each of said pilot valves having a pressure chamber connected with a source of operating fluid under pressure and a pilot disc in said chamber, each of said pilot discs having a throughport and a U-shaped port, each of said pilot valves also having a first passageway in continuous communication with the U-shaped port of its pilot disc and a second passageway positioned so that it registers at times with either the throughport or the U-shaped port of said pilot disc, the first passageway of the first of said pilot valves being connected with the atmosphere, the U-shaped port of the pilot disc of said first pilot valve normally being positioned to interconnect said second passageway with said first passageway of said first pilot valve, the first passageway of said first pilot valve being connected with the first passageway of the second of said pilot valves and the second passageway of said second pilot valve being connected with said main valve so that operating fluid can be admitted into and exhausted from said main valve under the control of the ports in the pilot disc of said second pilot valve and flow through said first pilot valve without requiring any actuation of the pilot disc of said first pilot valve, or be admitted directly to said main valve; a pressure-responsive mechanism for actuating the pilot disc of said first pilot valve, said mechanism being connected with one of said chambers of said main valve, whereby said first pilot valve is automatically actuated in accordance with pressure changes in said chamber; and a fluid-pressure-operable device for actuating the pilot disc of said second pilot valve, the second passageway of the third pilot valve being connected with said fluid-pressure-operable device and the first passageway of said third pilot valve being connected with the atmosphere, said third pilot valve including means for manually operating the pilot disc thereof, whereby said third pilot disc can control the admission and exhaust of operating fluid into said fluid-pressure-operable device to effect actuation of the pilot disc of said second pilot valve to effect closing of said main valve independently of the position of the pilot disc of said first pilot valve.

DONALD G. GRISWOLD.

REFERENCES CITED

The following references are of record in the file of this patent:

UNITED STATES PATENTS

| Number | Name | Date |
|---|---|---|
| 542,733 | Johnson | July 16, 1895 |
| 585,377 | Craig | June 29, 1897 |
| 632,223 | Marrder | Aug. 29, 1899 |
| 687,273 | Schoeffel | Nov. 26, 1901 |
| 863,299 | Manning | Aug. 13, 1907 |
| 937,774 | Cunning | Oct. 26, 1909 |
| 1,410,098 | Hamilton | Mar. 21, 1922 |
| 1,529,218 | Sandwell | Mar. 10, 1925 |
| 1,546,356 | Anderson | July 21, 1925 |
| 1,606,245 | Lang | Nov. 9, 1926 |
| 1,627,628 | Anderson | May 10, 1927 |
| 1,769,612 | Wettstein | July 1, 1930 |
| 1,846,376 | Walker | Feb. 23, 1932 |
| 1,987,032 | Spence | Jan. 8, 1935 |
| 2,020,847 | Mitereff | Nov. 12, 1935 |
| 2,067,953 | Spence | Jan. 19, 1937 |
| 2,193,720 | Griswold | Mar. 12, 1940 |
| 2,202,286 | Gorrie | May 28, 1940 |
| 2,251,481 | Corbin | Aug. 5, 1941 |
| 2,322,517 | Hose | June 22, 1943 |
| 2,331,507 | Ring | Oct. 12, 1943 |

FOREIGN PATENTS

| Number | Country | Date |
|---|---|---|
| 18,735 | Great Britain | Aug. 15, 1912 |